United States Patent [19]

Sigan et al.

[11] 4,251,385

[45] Feb. 17, 1981

[54] DIOL COMPOSITIONS

[75] Inventors: Jack W. Sigan, Worthington, Ohio; James G. Fuller, Edgerton, Wis.

[73] Assignee: Sherex Chemical Company, Inc., Dublin, Ohio

[21] Appl. No.: 941,224

[22] Filed: Sep. 11, 1978

[51] Int. Cl.³ .............................................. C08G 63/68
[52] U.S. Cl. .......................... 252/182; 260/DIG. 24; 568/609; 568/610; 568/641
[58] Field of Search ................ 252/182; 568/609, 610, 568/641; 260/DIG. 24

[56] References Cited

U.S. PATENT DOCUMENTS

| | | | |
|---|---|---|---|
| 3,513,188 | 5/1970 | Smith | 568/609 |
| 3,660,318 | 5/1972 | Taniuchi et al. | 568/609 |
| 3,794,617 | 2/1974 | Mains et al. | 568/609 |
| 3,809,681 | 5/1974 | Musser et al. | 568/641 |
| 3,895,077 | 7/1975 | Brady et al. | 568/641 |
| 4,128,532 | 12/1978 | Eimers et al. | 528/79 |

*Primary Examiner*—Benjamin R. Padgett
*Assistant Examiner*—Irwin Gluck
*Attorney, Agent, or Firm*—Edward B. Dunning; Burton A. Amernick

[57] ABSTRACT

A polyol composition consisting essentially of a homogeneous liquid or low melting solid admixture of propylene glycol and a diol obtained by alkoxylating a propylene glycol dispersion of 3,3',5,5' tetrabromobisphenol A with ethylene oxide, propylene oxide or mixtures thereof. These polyol compositions are useful in preparing fire and chemical resistant thermosetting resinous compositions.

12 Claims, No Drawings

DIOL COMPOSITIONS

BACKGROUND OF THE INVENTION

1. Field of the Invention

This invention relates to diol compositions.

2. Description of the Prior Art

Thermosetting polyester resinous compositions comprising solutions of an essentially linear unsaturated polyester in a vinyl monomeric crosslinking agent, e.g., styrene, are extensively utilized to prepare molded or cast thermoset plastic articles. The indicated linear polyesters are obtained by condensing an $\alpha,\beta$-ethylenically unsaturated dicarboxylic acid as all or part of the diacid component with a glycol. The bulk of the glycols used for this purpose is propylene glycol.

Where it is desired to impart fire and chemical resistance to the polyester, a halogenated diacid and/or a halogenated diol is generally incorporated into the polyester structure for optimum results. A particularly preferred halogenated compound useful for this purpose is the diol obtained by alkoxylating 3,3',5,5' tetrabromobisphenol A. In accordance with the prior art, the alkoxylation reaction is carried out in an inert solvent which is removed upon completion of the reaction to provide the compound as a high melting solid which is sold as a powder or solid melt. Removal of the solvent in this manner is costly and moreover provides a product which is difficult to handle in connection with its use to prepare linear polyester resins.

SUMMARY OF THE INVENTION

In accordance with this invention, diol compositions are provided by reacting a propylene glycol dispersion of 3,3',5,5' tetrabromobisphenol A with at least a stoichiometrical amount based on said phenolic compound of ethylene oxide, propylene oxide or mixtures thereof. Conventional alkoxylation reaction conditions apply resulting in essentially complete preferential addition of the alkylene oxide to the phenolic hydroxy groups present.

DESCRIPTION OF THE PREFERRED EMBODIMENT

Bisphenol A, the starting material in the practice of this invention, is a commodity chemical prepared by condensing phenol with acetone. The 3,3', 5,5' tetrabromobisphenol A derivative is likewise commercially available and a representative product will be identified in the working example to follow. The indicated bromo derivative is dispersible in propylene glycol and, accordingly in preparing the diol compositions of this invention, the tetrabromobisphenol A is first dispersed in said glycol prior to effecting the alkoxylation thereof. Applicable dispersions of this type are composed of said glycol and the brominated bisphenol A in the weight ratio of from 1:19::1:2, respectively. A more preferred range of ratios for the utilitarian purposes contemplated herein is from about 1:9::1:4, respectively.

The glycol dispersion of the tetrabromobisphenol A is reacted with the alklyene oxide under conditions normally observed in an adduction reaction of this type. These conditions include a temperature of from 50° C. to 200° C. and more preferably from about 100° C. to 150° C. Pressure conditions are in the order of from 0.5 to 14 atmospheres. However, a preferred range of pressure is from about 3 to 6 atmospheres corresponding to the autogenous pressures developed when observing a reaction temperature with the preferred range. Conventionally, a basic catalyst is employed to facilitate the reaction. Strong bases such as the alkali metal hydroxides, sodium methylate and the like are particularly suitable.

As previously indicated, the preferred alkylene oxides useful in the practice of this invention are propylene oxide and ethylene oxide. Mixtures of these oxides are likewise applicable. The preferred ratio of the alkylene oxide to the tetrabromobisphenol A is about stoichiometrical; i.e., 2–2.2 moles of the alkylene oxide per mole of said phenol. Higher ratios of alkylene oxide can be employed. However, when the stoichiometrical amount is substantially exceeded there is the likelihood of producing a diol which may not be considered as the most desirable in preparing linear polyesters of optimum rigidity, chemical and/or fire resistance.

The end point of the alkoxylation reaction can be conveniently determined by noting when the reaction pressure completely subsides. In the situation where a stoichiometrical amount of the alkylene oxide is observed, the completion of reaction is indicated by a nil acid value upon completion of the reaction. The product is discharged from the reactor, cooled and then can be used as such in the formulation of linear polyesters suitable for use for formulating thermosetting polyester resinous compositions. There is no need here to go into any details regarding the preparation of such polyesters or their use in formulating the indicated thermosetting compositions since this area of technology is highly developed and abundantly documented in the patent art.

For the purpose of illustrating the best mode contemplated for practicing the present invention, the following working example is given. All parts and percentages set forth are parts by weight unless otherwise indicated.

EXAMPLE I

Into a suitable pressure reaction vessel were charged 546 parts of tetrabromobisphenol A (BA-50; Great Lakes Chemical Corp.), 276 parts propylene glycol and 7.3 parts of alcoholic potassium hydroxide containing 25% active. Ethylene oxide in the amount of 97 parts were added at 105°–115° C., providing a pressure of about six atmospheres maximum. The ethylene oxide was allowed to react at the temperature conditions noted until there was no detectable acid value. The product was discharged from the reaction vessel and exhibited a hydroxyl value of 540. The product was a clear liquid at room temperature.

What is claimed is:

1. A diol composition adapted for use in preparing linear polyester resins obtained by reacting in propylene glycol as the solvent 3,3',5,5' tetrabromobisphenol A with at least two moles of an alkylene oxide selected from the group consisting of ethylene oxide, propylene oxide and mixtures thereof at a temperature of from 50° to 200° C. and a pressure of from 0.5 to 14 atmospheres, said glycol and said brominated bisphenol A being present in the reaction mixture in the weight ratio of from 1:19::1:2, respectively.

2. A diol composition in accordance with claim 1 wherein about two moles of the alkylene oxide is reacted with a mole of said brominated bisphenol A.

3. A diol composition in accordance with claim 2 wherein the weight ratio of said glycol to said bisphenol A is from 1:9::1:4, respectively.

4. A diol composition in accordance with claim 3 wherein said alkylene oxide is ethylene oxide.

5. A diol composition in accordance with claim 3 wherein said glycol alkylene oxide is propylene oxide.

6. A process for preparing a diol composition for use in preparing linear polyester resins which comprises reacting in propylene glycol as the solvent 3,3',5,5'-tetrabromobisphenol-A with at least about 2 moles of an alkylene oxide selected from the group of ethylene oxide, propylene oxide, or mixtures thereof at a temperature of 50° to 200° C., and a pressure of 0.5 to 14 atmospheres, wherein said glycol and said brominated bisphenol-A are present in the reaction mixture in the weight ratio of from 1:9::1:2, respectively.

7. The process of claim 6 wherein said temperature is about 100° to 150° C.

8. The process of claim 6 carried out in the presence of a basic catalyst.

9. The process of claim 8 wherein said basic catalyst includes alkali metal hydroxide or sodium methylate.

10. The process of claim 6 wherein said pressure is about 3 to 6 atmospheres.

11. The process of claim 6 wherein about 2 moles of the alkylene oxide are reacted with a mole of said brominated bisphenol-A.

12. The process of claim 6 wherein the weight ratio of said glycol to said bisphenol-A is from 1:9::1:4, respectively.

* * * * *